(12) United States Patent
Kim

(10) Patent No.: US 6,826,277 B1
(45) Date of Patent: Nov. 30, 2004

(54) METHOD FOR REGISTERING AND SEARCHING DIALING INFORMATION IN A COMMUNICATION APPARATUS

(75) Inventor: Sung-Hyun Kim, Goomi (KR)

(73) Assignee: Samsung Electronics, Co., Ltd., Suwon-si (KR)

(*) Notice: Subject to any disclaimer, the term of this patent is extended or adjusted under 35 U.S.C. 154(b) by 0 days.

(21) Appl. No.: 08/639,077

(22) Filed: Apr. 24, 1996

(30) Foreign Application Priority Data

Apr. 27, 1995 (KR) .............................. 10-1995-0010173

(51) Int. Cl.[7] .......................................... H04M 1/2745
(52) U.S. Cl. ........................... 379/355.02; 379/356.01; 379/357.05
(58) Field of Search ....................... 379/355.01, 355.05, 379/356.01, 357.05

(56) References Cited

U.S. PATENT DOCUMENTS

| | | | |
|---|---|---|---|
| 4,982,423 A | | 1/1991 | Muroi |
| 5,034,976 A | | 7/1991 | Sato |
| 5,216,705 A | | 6/1993 | Yoshida et al. |
| 5,267,308 A | | 11/1993 | Jokinen et al. |
| 5,349,629 A | | 9/1994 | Kumano |
| 5,454,035 A | | 9/1995 | Oba et al. |
| 5,467,392 A | | 11/1995 | Norimatsu |
| 5,483,591 A | * | 1/1996 | Koma ..................... 379/355 |
| 5,509,067 A | * | 4/1996 | Murata .................... 379/355 |
| 5,590,189 A | * | 12/1996 | Turnbull et al. ........ 379/355.05 |
| 5,592,546 A | * | 1/1997 | Takahashi ............... 379/355.05 |
| 5,687,216 A | * | 11/1997 | Svensson ................. 379/357 |

FOREIGN PATENT DOCUMENTS

| | | |
|---|---|---|
| EP | 0398711 A2 | 11/1990 |
| EP | 0567333 A1 | 10/1993 |
| EP | 0624965 A2 | 11/1994 |
| EP | 0624965 A3 | 11/1994 |
| GB | 2232556 A | 12/1990 |
| GB | 2266797 A | 10/1993 |
| WO | WO 81/02824 A1 | 10/1981 |
| WO | WO 84/02440 A1 | 6/1984 |

* cited by examiner

*Primary Examiner*—Minsun Oh Harvey
*Assistant Examiner*—Daniel Swerdlow
(74) *Attorney, Agent, or Firm*—Robert E. Bushnell, Esq.

(57) ABSTRACT

A method for registering dialing information contemplates the steps of: inputting dialing information for storage in a dial buffer; registering in memory the dialing information stored in the dial buffer; sorting the dialing information registered in memory in an order such that the more recently registered dialing information is arranged before the less recently registered dialing information; and automatically deleting from memory dialing information which has not been redialed within a predetermined number of dialing operations. A method for searching the registered dialing information contemplates the steps of: sorting the dialing information registered in memory in an order such that the more recently registered dialing information is arranged before the less recently registered dialing information when a search key is input through a key input unit; inputting through the key input unit a keyword representing a portion or all of a telephone number corresponding to desired dialing information and then storing the input keyword in the dial buffer; searching for the dialing information corresponding to the keyword stored in the dial buffer from among the dialing information registered in memory; displaying the dialing information corresponding to the keyword; and selecting and dialing the telephone number corresponding to the displayed dialing information.

30 Claims, 4 Drawing Sheets

METHOD FOR REGISTERING AND SEARCHING DIALING INFORMATION IN A COMMUNICATION APPARATUS

CROSS-REFERENCE TO RELATED APPLICATIONS

This application makes reference to, incorporates the same herein, and claims all benefits accruing under 35 U.S.C. §119 from an application for Method For Registering And Searching Dialing Information In A Communication Apparatus earlier filed in the Korean Industrial Property Office on 27 Apr. 1995 and there assigned Ser. No. 10173/1995.

BACKGROUND OF THE INVENTION

The present invention relates to a communication apparatus, and more particularly, to a method for registering and searching dialing information in a communication apparatus.

Telephones and facsimiles are general examples of communication apparatuses that are often provided with features, such as a one-touch dialing feature and/or an abbreviated dialing feature. An example of this type of communication apparatus is disclosed in U.S. Pat. No. 5,349,629 issued to Kumano. To accommodate these features, a communication apparatus is provided with a memory in which various dialing information is stored and searched.

In conventional communication apparatuses having these features, dialing information is first typically stored in memory, and can then be automatically dialed in response to depression of a one-touch dialing key or an abbreviated dialing key. In order to search the memory for desired dialing information, a search key is typically pressed and the stored dialing information is sequentially searched and displayed according to the depression of an up key or a down key. In this disclosure, dialing information refers to alphanumeric information, such as a telephone number and a name, which is stored in memory in correspondence with the one-touch dialing key or the abbreviated dialing key.

With many conventional communication apparatuses, however, there has been a problem in that a great deal of dialing information is typically registered into memory, and the registered dialing information must be individually checked while searching. Accordingly, key operation can become burdensome and inconvenient.

There has been another problem in conventional communication apparatuses in that identical dialing information is often repeatedly registered into memory in cases where the user can not fully remember all of the dialing information that has been previously stored in memory. Accordingly, the memory capacity of the communication apparatus is not optimally utilized.

Furthermore, there has been yet another problem in conventional communication apparatuses in that outdated dialing information often remains in memory without the knowledge of the user. Accordingly, new dialing information may not be able to be registered into memory since the memory capacity of the communication apparatus is limited.

SUMMARY OF THE INVENTION

Accordingly, it is an object of the present invention to provide an improved method for registering and searching dialing information in a communication apparatus.

It is another object to provide a method for registering dialing information in a communication apparatus in which dialing information is sorted such that the more recently registered dialing information is arranged ahead of the less recently registered dialing information.

It is still another object to provide a method for registering dialing information in a communication apparatus in which dialing information that is already registered in memory is not redundantly registered.

It is yet another object to provide a method for registering dialing information in a communication apparatus in which dialing information which has not been redialed within a predetermined number of dialing operations is automatically deleted from memory.

It is still yet another object to provide a method for searching dialing information in a communication apparatus by inputting only an initial portion of the desired dialing information.

These other objects can be achieved in accordance with the principles of the present invention with a method for registering dialing information and a method for searching the registered dialing information. The method for registering the dialing information contemplates the steps of: inputting dialing information for storage in a dial buffer; registering in memory the dialing information stored in the dial buffer; sorting the dialing information registered in memory in an order such that the more recently registered dialing information is arranged before the less recently registered dialing information; and automatically deleting from memory dialing information which has not been redialed within a predetermined number of dialing operations.

The method for searching the registered dialing information contemplates the steps of: sorting the dialing information registered in memory in an order such that the more recently registered dialing information is arranged before the less recently registered dialing information when a search key is input through a key input unit; inputting through the key input unit a keyword representing a portion or all of a telephone number corresponding to desired dialing information and then storing the input keyword in the dial buffer; searching for the dialing information corresponding to the keyword stored in the dial buffer from among the dialing information registered in memory; displaying the dialing information corresponding to the keyword; and selecting and dialing the telephone number corresponding to the displayed dialing information.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
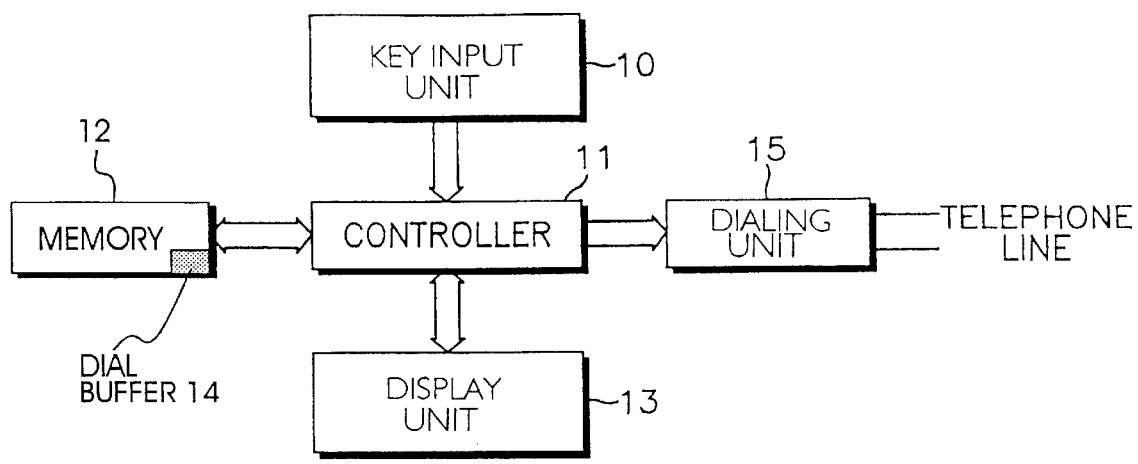
FIG. 1 is a block diagram illustrating a communication apparatus constructed according to the principles of the present invention.

Turning now to the drawings and referring to FIG. 1, a block diagram of a communication apparatus constructed according to the principles of the present invention is shown. The communication apparatus of FIG. 1 comprises: a key input unit 10 having alphanumeric keys for entering dialing information and a keyword, a search key, and various function keys. A controller 11 receives the dialing information entered through key input unit 10, and automatically registers the dialing information in a memory 12. Controller 11 also searches memory 12 for registered dialing information. Memory 12 stores the dialing information input through key input unit 10, and also stores a program for storing and searching the dialing information under the control of controller 11. A dial buffer 14 is included within memory 12 for temporary storage of the dialing information. A display unit 13 provides variable visual display of the dialing information under the control of controller 11. A dialing unit 15 dials desired dialing information under the control of controller 11.

Figure 2A:
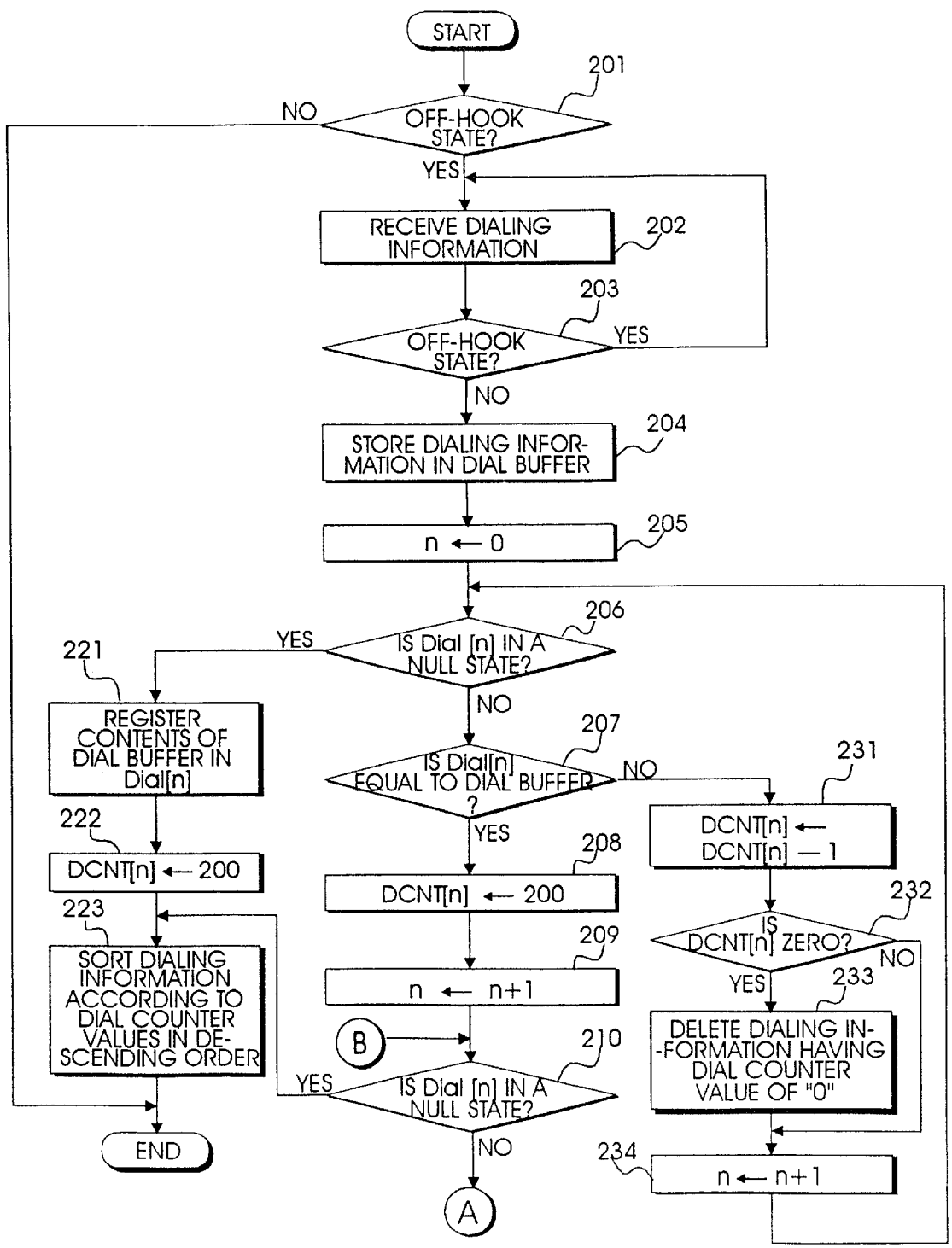
FIGS. 2A and 2B are flow charts illustrating a method for registering dialing information in a memory according to the principles of the present invention.
Figure 2B:
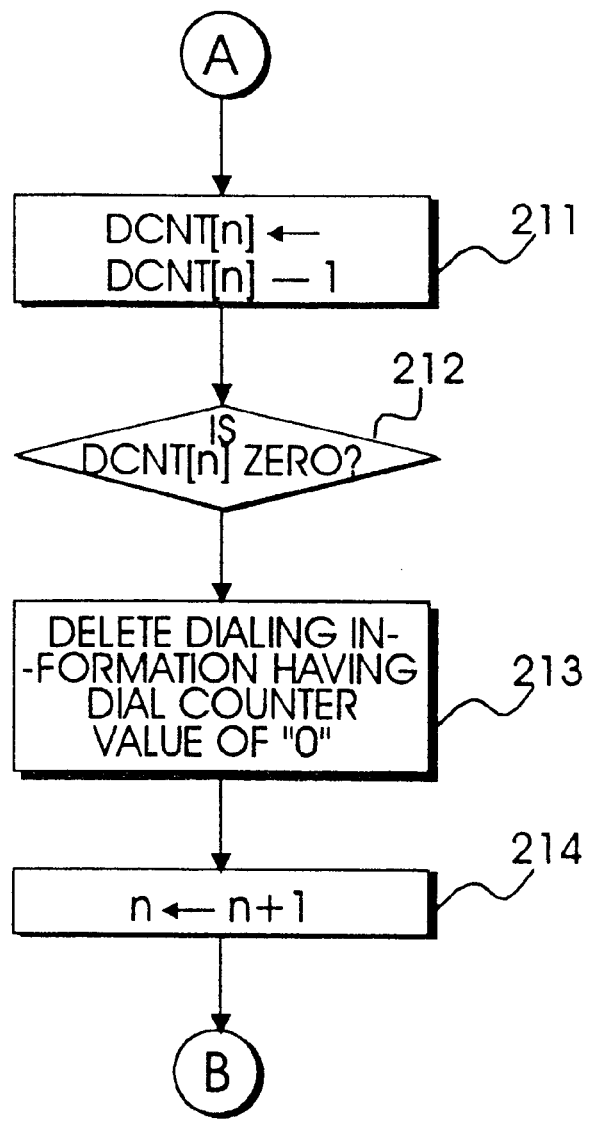

FIGS. 2A and 2B are flow charts illustrating a method for registering dialing information in memory 12 according to the principles of the present invention. Briefly, the method of FIGS. 2A and 2B comprises the steps of: inputting dialing information for storage in dial buffer 14; registering in memory 12 the dialing information stored in dial buffer 14; sorting the dialing information registered in memory 12 in an order such that the more recently registered dialing information is arranged before the less recently registered dialing information; and deleting dialing information which has not been redialed within a predetermined number of dialing operations. According to this method, dialing information is registered at the time of actual dialing.

Figure 3:
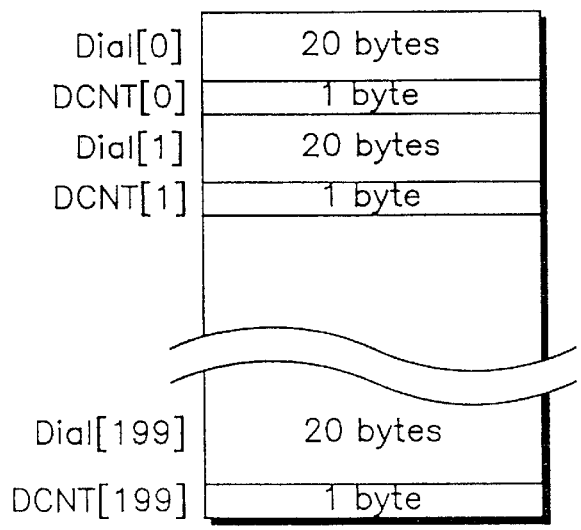
FIG. 3 is a view illustrating a memory map for storing dialing information according to the principles of the present invention.

FIG. 3 is a view illustrating a memory map for registering dialing information according to the principles of the present invention. The memory map of the present invention includes a plurality of dialing information storage areas (i.e., Dial[0]–Dial[199]) totaling 4000 bytes of memory 12 for registering data corresponding to the dialing information. The memory map further includes areas (i.e., DCNT[0]–DCNT[199]) totaling 200 bytes of memory 12 for registering dial counter values corresponding to the dialing information.

Figure 4:
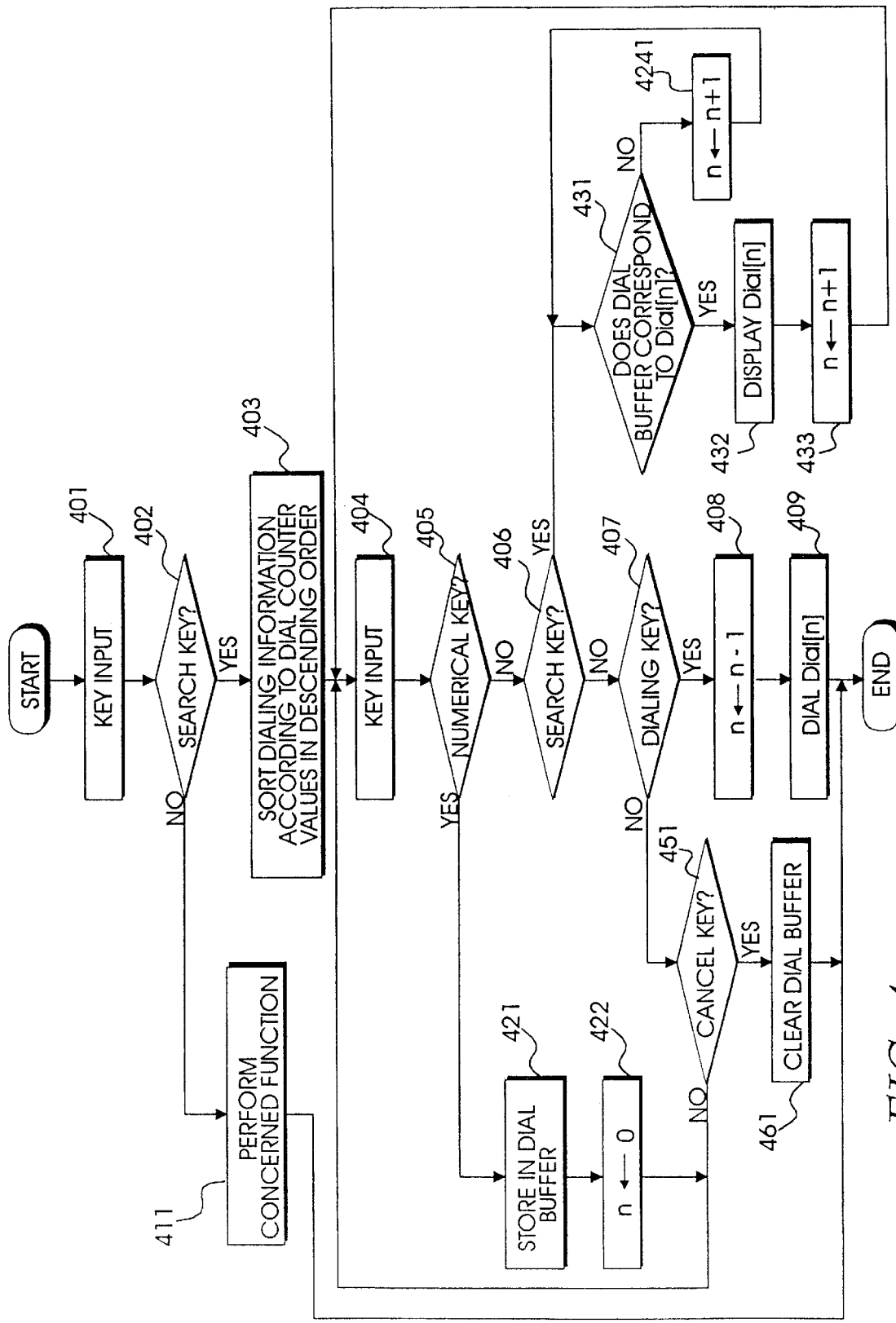
FIG. 4 is a flow chart illustrating a method for searching dialing information according to the principles of the present invention.

FIG. 4 is a flow chart illustrating a method for searching the registered dialing information according to the principles of the present invention. Briefly, the method of FIG. 4 comprises the steps of: sorting the dialing information registered in memory 12 in an order such that the more recently registered dialing information is arranged before the less recently registered dialing information when a search key is input through key input unit 10; inputting through key input unit 10 a keyword representing a portion or all of a telephone number corresponding to desired dialing information and then storing the input keyword in dial buffer 14; searching for the dialing information corresponding to the keyword stored in dial buffer 14 from among the dialing information registered in memory 12; displaying the dialing information corresponding to the keyword; and selecting and dialing the telephone number corresponding to the displayed dialing information.

Referring now to FIGS. 1 to 4, a preferred embodiment of the present invention will be described in detail. First, the method for registering dialing information in a memory according to the principles of the present invention will be described in detail with reference to FIGS. 2A and 2B.

In step 201, controller 11 determines whether an off-hook state exists, and proceeds to step 202 when an off-hook state exists. In step 202, controller 11 receives dialing information entered through key input unit 10 and then advances to step 203. In step 203, controller 11 again determines whether the off-hook state exists, and proceeds to step 204 when the off-hook state does not exist. Otherwise, step 202 is repeatedly performed to thereby receive the dialing information. In step 204, controller 11 stores the dialing information entered through key input unit 10 in a dial buffer and then advances to step 205. In step 205, controller 11 clears an index register value n by setting the index register value n equal to zero. Then, in step 206, controller 11 determines whether the dialing information storage area Dial[n] of memory 12 is in a null state; that is, controller 11 determines whether Dial[n] is available to store the input dialing information. When Dial[n] is in the null state, controller 11 reads out the dialing information stored in dial buffer 14 and registers the dialing information in Dial[n] of memory 12 in step 221, and then proceeds to step 222. In step 222, controller 11 sets a dial counter value stored in DCNT[n] for the registered dialing information to "200". The dial counter value of DCNT[n] is set to "200" to represent the last dialing event. The closer the dial counter value of DCNT[n] is to "200", the more recent the corresponding dialing information is. In step 223, controller 11 sorts the dialing information according to the dial counter values in a descending order, and then terminates operation. That is, the dialing information registered in memory 12 is sorted in an order such that the more recently registered dialing information is arranged before the less recently registered dialing information. Although the dialing information is sorted according to the dial counter values in descending order in the disclosed embodiment of the present invention, it will be intuitive to those skilled in the art that the dialing information can alternatively be sorted according to the dial counter values in an ascending order without departing from the principles of the present invention.

Referring back to step 206, when controller 11 determines that the dialing information storage area Dial[n] of memory 12 is not in a null state, and therefore contains dialing information, controller 11 performs step 207. In step 207, controller 11 determines whether the dialing information stored in dial buffer 14 is equal to the dialing information which has been previously registered in Dial[n] of memory 12. At this time, if the dialing information stored in dial buffer 14 is not the same as the dialing information registered in Dial[n] of memory 12, controller 11 performs step 231 and decrements the dial counter value of DCNT[n] in memory 12 by one. Then, in step 232, controller 11 determines whether the dial counter value of DCNT[n] is equal to zero. At this time, if the dial counter value of DCNT[n] is equal to zero, controller 11 performs step 233; alternatively, controller 11 performs step 234. In step 233, controller 11 deletes the dialing information in memory 12 having the dial counter value equal to zero. And then, in step 234, controller 11 increments the index register value n in memory 12 by one, and then performs step 206.

Referring back to step 207, when controller 11 determines that the dialing information stored in dial buffer 14 is equal to the dialing information registered in Dial[n] of memory 12, controller 11 performs step 208. In step 208, controller 11 updates the dial counter value stored in DCNT[n] for the dialing information registered in Dial[n] of memory 12 to "200". Then, in step 209, controller 11 increments the index register value n by one. In step 210, controller 11 determines whether the dialing information storage area Dial[n] of memory 12 corresponding to the incremented index register value n is in the null state. When the dialing information storage area Dial[n] is in the null state, controller 11 performs step 223. Otherwise, controller 11 performs step 211. In step 211, controller 11 decrements the dial counter value of DCNT[n] by one. Then, in step 212, controller 11 determines whether the dial counter value of DCNT[n] is equal to zero. When the dial counter value of DCNT[n] is equal to zero, controller 11 performs step 213 and deletes the dialing information in memory 12 having the dial counter value equal to zero.

In step 214, controller 11 increments the index register value n by one, and then performs step 210. As described above, the present invention provides a method wherein dialing information is automatically sorted such that the more recently registered dialing information is arranged before the less recently registered dialing information. Moreover, dialing information that is already registered in memory 12 is not re-registered, and dialing information which has not been redialed within a predetermined number of dialing operations is automatically deleted. Accordingly, the storage capacity of memory 12 can be optimally utilized.

After the dialing information is registered, sorted and deleted as described above, the registered dialing information can be searched and dialed. The method for searching dialing information according to the principles of the present invention will now be described in detail with referrence to FIG. 4.

In step 401, controller 11 receives a key input from key input unit 100 and then performs step 402 to determine whether the received key input corresponds to a search key. If the received key input does not correspond to the search key, controller 11 performs the concerned function in step 411, and then terminates operation. However, if the received key input does correspond to the search key, controller 11 performs step 403 to thereby sort the dialing information according to dialing counter values in the descending order. As stated earlier, this sorts the dialing information such that the more recently registered dialing information is arranged ahead of the less recently registered dialing information. Then, in step 404, controller 11 receives a key input from key input unit 10 and then performs step 405 to determine whether the key input corresponds to a numerical key. If the received key input does not correspond to a numerical key, controller 11 performs step 406. Otherwise, controller 11 performs step 421. During this time, a received numerical key represents a keyword for searching dialing information.

In step 421, controller 11 stores the numerical value corresponding to the input numerical key in dial buffer 14. Then, in step 422, controller 11 clears the index register value n by setting the index register value n equal to zero, and then returns to step 404 to receive another key input from key input unit 10. In this manner, the user can sequentially input numerical keys and store the corresponding numerical values through the repetition of steps 404, 405, 421 and 422. When the key input received in step 404 is determined not to be a numerical key in step 405, controller 11 performs step 406 to determine whether the key input corresponds to the search key. If the key input does not correspond to the search key, controller 11 performs step 407. Otherwise, controller 11 performs step 431.

In step 431, controller 11 determines whether the numerical information (i.e., keyword) stored in dial buffer 14 corresponds to dialing information stored in Dial[n]. That is, controller 11 determines whether the numerical information stored in dial buffer 14 is equal to the dialing information, or to an initial portion of the dialing information, which has been previously registered in Dial[n] of memory 12. If the numerical information stored in dial buffer 14 does not correspond to the dialing information stored in Dial[n], controller 11 performs step 441 to thereby increment the index register value n by one, and then repeats step 431. In step 431, the numerical information (i.e., keyword) is sequentially compared with the dialing information registered in Dial[n] of memory 12. When the dialing information, or an initial portion of the dialing information, is identical to the numerical information stored in dial buffer 14, controller 11 performs step 432 to thereby display on display unit 13 the dialing information corresponding to the numerical information stored in dial buffer 14. Then, in step 433, the index register value n is incremented by one, and controller 11 again performs step 404.

An example of the operation of the above-described method is as follows. If numerical key inputs corresponding to "02" are sequentially entered by the user in step 404, and then the search key is entered in step 406, all dialing information beginning with "02" can be sequentially displayed in the order such that the more recently dialed dialing information is displayed first. After the numerical key inputs corresponding to "02" are entered, if another numerical key input corresponding to "3" is also entered, and the search key is then entered, all dialing information beginning with "023" can be displayed in the order such that the more recently dialed dialing information is displayed first.

In step 407, controller 11 determines whether a key input received in step 404 corresponds to a dialing key. If the key input does not correspond to the dialing key, controller 11 performs step 451; otherwise, controller 11 performs step 408. In step 451, controller 11 determines whether a key input received in step 404 corresponds to a cancel key. If the key input corresponds to the cancel key, the numerical information (i.e., keyword) stored in dial buffer 14 is cleared in step 461, and then the program is terminated. Alternatively, if the key input does not correspond to the cancel key in step 451, step 404 is repeated.

In step 408, controller 11 decrements the index register value n by one, and then performs step 409. The index register value n is decremented in step 408 to compensate for the fact that the index register value n has been incremented in step 433. This enables proper selection of the desired dialing information. In step 409, the telephone number corresponding to the desired dialing information is dialed, and then the program is terminated.

As described above, the present invention automatically stores dialing information at the time of dialing in a communication apparatus, thereby preventing the user from having to repeatedly provide the same key inputs. Also, the present invention enables input of a keyword that represents only an initial portion of desired dialing information, and searches for the desired dialing information using the keyword. Accordingly, the user is not required to completely remember the dialing information, and the applicable searching time is reduced.

Furthermore, the present invention does not redundantly store dialing information that is already registered, and automatically deletes dialing information which has not been redialed within a predetermined number of dialing operations.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A method of registering dialing information in a memory of a communication apparatus, the method comprising:

inputting the dialing information via a key input unit, and then registering the dialing information in the memory; and sorting the dialing information registered in the memory by arranging the dialing information sequentially in the memory in an order wherein the dialing information that has been registered more recently is arranged before the dialing information that has been registered less recently; and deleting the dialing information registered in the memory that has not been redialed within a predetermined number of dialing operations.

2. The method as claimed in claim 1, wherein sorting the dialing information comprises:

assigning predetermined dial counter values to the dialing information indicating an order in which the dialing information has been registered; and sorting the dialing information in one of an ascending order and a descending order in accordance with the predetermined dial counter values.

3. The method as claimed in claim 1, wherein deleting the dialing information comprises:

assigning predetermined dial counter values to the dialing information indicating an order in which the dialing information has been registered; and deleting the dialing information registered in the memory having dial counter values indicating that redialing has not occurred within the predetermined number of dialing operations.

4. The method as claimed in claim 1, further comprising preventing reregistration of dialing information that is currently registered in the memory.

5. A method of searching dialing information registered in a memory of a communication apparatus, the method comprising:

sorting the dialing information registered in the memory, in response to input of a search key via a key input unit, by arranging the dialing information sequentially in the memory in an order wherein the dialing information that has been registered more recently is arranged before the dialing information that has been registered less recently;

inputting a keyword via the key input unit, said keyword representing at least a portion of a telephone number corresponding to desired dialing information;

searching the memory for the desired dialing information, and displaying the desired dialing information on a display unit;

selecting and dialing the telephone number corresponding to the desired dialing information; and deleting the dialing information registered in the memory that has not been redialed within a predetermined number of dialing operations.

6. The method as claimed in claim 5, wherein selecting and dialing comprises inputting a dialing key via said key input unit, while the desired dialing information is displayed on the display unit.

7. The method as claimed in claim 5, wherein inputting a keyword comprises inputting numerical keys corresponding to keyword via key input unit.

8. A method of registering dialing information in a memory and searching the dialing information registered in the memory in a communication apparatus, the registering comprising:

inputting the dialing information via a key input unit, and then registering the dialing information in the memory; and sorting the dialing information registered in the memory by arranging the dialing information sequentially in the memory in an order wherein the dialing information that has been registered more recently is arranged before the dialing information that has been registered less recently;

the searching comprising:

inputting a keyword via the key input unit, the key word representing at least a portion of telephone number corresponding to desired dialing information;

searching the memory for the desired dialing information, and displaying the desired dialing information on a display unit; and selecting and dialing the telephone number corresponding to the desired dialing information; and deleting the dialing information registered in the memory that has not been redialed within a predetermined number of dialing operations.

9. The method as claimed in claim 8, wherein deleting the dialing information comprises:

assigning predetermined dial counter values to the dialing information indicating an order in which the dialing information has been registered; and deleting the dialing information registered in the memory having dial counter values indicating that redialing has not occurred within the predetermined number of dialing operations.

10. The method as claimed in claim 9, wherein step inputting the keyword comprises inputting numerical keys corresponding to said keyword via said key input unit.

11. The method as claimed in claim 10, wherein sorting the dialing inforamtion comprises:

assigning predetermined dial counter values to the dialing information indicating an order in which the dialing information has been registered; and sorting the dialing information in one of an ascending order and a descending order in accordance with the predetermined dial counter values.

12. The method as claimed in claim 8, wherein sorting the dialing information comprises:

assigning predetermined dial counter values to the dialing information indicating an order in which the dialing information has been registered; and sorting the dialing information in one of an ascending order and a descending order in accordance with the predetermined dial counter values.

13. The method as claimed in claim 8, further comprising preventing reregistration of the dialing information that is currently registered in the memory.

14. A communication apparatus, comprising:

a plurality of input keys adapted to input dialing information;

a memory for storing said dialing information; and a controller adapted to arrange said dialing information sequentially in said memory in an order wherein said dialing information that has been stored more recently is arranged before said dialing information that has been stored less recently, and for preventing redundant storage of said dialing information within said memory, and for deleting said dialing information stored in said memory that has not been redialed within a predetermined number of dialing operations.

15. The communication apparatus as claimed in claim 14, further comprising a display adapted to provide variable visual display of said dialing information.

16. A method of registering dialing information in a memory of a communication apparatus, the method comprising:

sequentially inputting the dialing information representing telephone numbers of different destination subscribers for subsequent speed dialing operations via a key input unit, and then registering the dialing information sequentially in the memory;

sorting the dialing information sequentially registered in the memory by arranging the dialing information sequentially in the memory for subsequent speed dialing operations in an order wherein the dialing information that has been registered in the memory more recently is arranged before any other dialing information that has been registered in the memory less recently; and deleting the dialing information registered in the memory that has not been redialed within a predetermined number of dialing operations.

17. The method as claimed in claim 16, wherein sorting the dialing information comprises:

assigning predetermined dial counter values to the dialing information indicating an order in which the dialing information has been sequentially registered in the memory; and sorting the dialing information in one of an ascending order and a descending order in accordance with the predetermined dial counter values.

18. The method as claimed in claim 16, wherein deleting the dialing information comprises:

assigning predetermined dial counter values to the dialing information indicating an order in which the dialing information has been sequentially registered in the memory; and deleting the dialing information sequentially registered in the memory having dial counter values indicating that redialing has not occurred within the predetermined number of the speed dialing operations.

19. The method as claimed in claim 16, further comprising preventing re-registration of the dialing information indicating a telephone number that is currently registered in the memory.

20. A method of searching dialing information registered in a memory of a communication apparatus, the method comprising:

sorting the dialing information representing telephone numbers of different destination subscribers for subsequent speed dialing operation registered in the memory, in response to input of a search key via a key input unit, by arranging the dialing information sequentially registered in the memory in an order wherein the dialing information that has been registered in the memory more recently is arranged before any other dialing information that has been registered in the memory less recently;

inputting a keyword via the key input unit during the speed dialing operation, the keyword representing at least a portion of a telephone number corresponding to desired dialing information;

searching the memory for the desired dialing information, and displaying the desired dialing information on a display unit;

selecting and dialing the telephone number corresponding to the desired dialing information during the speed dialing operation; and deleting the dialing information registered in the memory that has not been redialed within a predetermined number of dialing operations.

21. The method as claimed in claim 20, wherein selecting and dialing comprises inputting a speed dialing key via the key input unit, while the desired dialing information is displayed on the display unit.

22. The method as claimed in claim 20, wherein the keyword is input by numerical keys of the key input unit.

23. A method of registering dialing information in a memory and searching the dialing information registered in the memory in a communication apparatus, the method comprising:

sequentially inputting the dialing information indicating a different telephone number via a key input unit, and then registering the dialing information sequentially in the memory for subsequent speed dialing operation; and sorting the dialing information sequentially registered in the memory by arranging the dialing information sequentially in the memory for subsequent speed dialing operation in an order wherein the dialing information that has been registered in the memory more recently is arranged before any other dialing information that has been registered in the memory less recently;

after the dialing information has been sorted for the subsequent speed dialing operations, inputting a keyword via the key input unit during the speed dialing operation, the key word representing at least a portion of a telephone number corresponding to desired dialing information registered in the memory;

searching the memory for the desired dialing information during the speed dialing operation, and displaying the desired dialing information on a display unit;

selecting and dialing the telephone number corresponding to the desired dialing information during the speed dialing operation; and further deleting the dialing information registered in the memory that has not been redialed within a predetermined number of speed dialing operations.

24. The method as claimed in claim 23, wherein deleting the dialing information comprises:

assigning predetermined dial counter values to the dialing information indicating an order in which the dialing information has been registered in the memory; and deleting the dialing information registered in the memory having dial counter values indicating that redialing has not occurred within the predetermined number of the speed dialing operations.

25. The method as claimed in claim 24, wherein the keyword is input by numerical keys of the key input unit.

26. The method as claimed in claim 25, wherein sorting the dialing information comprises:

assigning predetermined dial counter values to the dialing information indicating an order in which the dialing information has been registered in the memory; and sorting the dialing information in one of an ascending order and a descending order in accordance with the predetermined dial counter values.

27. The method as claimed in claim 23, wherein sorting the dialing information comprises:

assigning predetermined dial counter values to the dialing information indicating an order in which the dialing information has been registered in the memory; and sorting the dialing information in one of an ascending order and a descending order in accordance with the predetermined dial counter values.

28. The method as claimed in claim 23, further comprising preventing re-registration of the dialing information indicating a telephone number that is currently registered in the memory.

29. A communication apparatus, comprising:

a plurality of discrete input keys adapted to input dialing information indicating telephone numbers of different destination subscribers, and to electively input a speed dialing operation;

a memory adapted to said dialing information;

a controller adapted to control said dialing information sequentially in said memory in an order wherein said dialing information that has been stored more recently is arranged before other dialing information that has been stored less recently, and for preventing redundant storage of said dialing information within said memory, and for deleting said dialing information stored in said memory that has not been redialed within a predetermined number of dialing operation.

30. The communication apparatus as claimed in claim 29, further comprising a display adapted to provide variable visual display of said dialing information.

* * * * *